US008942623B2

(12) United States Patent
Hillan

(10) Patent No.: US 8,942,623 B2
(45) Date of Patent: Jan. 27, 2015

(54) REDUCING NFC PEER MODE CONNECTION TIMES

(75) Inventor: John Hillan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 13/310,218

(22) Filed: Dec. 2, 2011

(65) Prior Publication Data

US 2013/0143487 A1 Jun. 6, 2013

(51) Int. Cl.
*H04B 5/00* (2006.01)

(52) U.S. Cl.
USPC ...... 455/41.1; 455/41.2; 455/231; 455/181.1; 370/346; 340/572.4

(58) Field of Classification Search
USPC ............ 455/41.1, 41.2, 231, 181.1, 418, 411, 455/434; 340/572.4; 370/346
See application file for complete search history.

(56) References Cited

U.S. PATENT DOCUMENTS

| 7,493,082 | B2 | 2/2009 | Perttila |
| 7,652,578 | B2* | 1/2010 | Braun et al. ............... 340/572.4 |
| 7,680,520 | B2 | 3/2010 | Ruuska et al. |
| 7,711,323 | B2 | 5/2010 | Fujii |
| 7,729,689 | B2* | 6/2010 | Chakraborty et al. ........ 455/418 |
| 7,734,307 | B2* | 6/2010 | Dawidowsky ............... 455/522 |
| 7,738,494 | B2 | 6/2010 | Takayama |
| 7,742,744 | B2 | 6/2010 | Twitchell, Jr. |
| 7,849,139 | B2 | 12/2010 | Wolfson et al. |
| 7,882,541 | B2* | 2/2011 | Yasaki et al. ..................... 726/2 |
| 7,929,910 | B2 | 4/2011 | Chen |
| 7,980,469 | B2 | 7/2011 | Matsuo |
| 8,018,344 | B2* | 9/2011 | Chang et al. ............... 340/572.1 |
| 8,060,012 | B2* | 11/2011 | Sklovsky et al. ............ 455/41.1 |
| 8,068,011 | B1 | 11/2011 | Sajadi et al. |

(Continued)

FOREIGN PATENT DOCUMENTS

EP 1653632 A1 5/2006
EP 2112634 A1 10/2009

(Continued)

OTHER PUBLICATIONS

Santosh Abraham (Qualcomm Inc): "Efficient Device and Service Discovery for Peer-to-Peer (P2P) scenarios; 11-11-1517-00-OWNG-efficient-device-and-service-di scovery-for-peer-to-peer-P2P-scenarios", IEEE-SA Mentor; Piscataway, NJ USA, vol. 802.11 WNG, Nov. 7, 2011, pp. 1-15, XP068037853, [retrieved on Nov. 7, 2011] p. 9.

(Continued)

*Primary Examiner* — Minh D Dao
(74) *Attorney, Agent, or Firm* — Charles E. Eggers

(57) ABSTRACT

Methods, apparatuses, systems, and computer-readable media for reducing Near Field Communication (NFC) Peer Mode connection times are presented. According to one or more aspects, a mode switching interval associated with an NFC device discovery loop may be defined. A first portion of the mode switching interval may be assigned to polling operations. A second portion of the mode switching interval may be assigned to listening operations. The first portion and the second portion of the mode switching interval respectively may occupy less than all of the mode switching interval, and the second portion of the mode switching interval may be shifted in position within the mode switching interval for respective iterations of the NFC device discovery loop.

36 Claims, 6 Drawing Sheets

(56) References Cited

U.S. PATENT DOCUMENTS

| | | |
|---|---|---|
| 8,112,066 B2 * | 2/2012 | Ben Ayed .................... 455/411 |
| 8,116,680 B2 * | 2/2012 | Bloebaum et al. ........... 455/41.1 |
| 8,140,053 B2 | 3/2012 | Jatschka et al. |
| 8,199,766 B2 | 6/2012 | Li et al. |
| 8,224,243 B2 | 7/2012 | Takayama et al. |
| 8,240,568 B2 | 8/2012 | Matsuo |
| 8,290,480 B2 | 10/2012 | Abramson et al. |
| 8,395,478 B2 | 3/2013 | Diab et al. |
| 8,401,596 B2 | 3/2013 | Takayama |
| 8,428,518 B2 | 4/2013 | Cordeiro |
| 8,433,375 B2 * | 4/2013 | Yamazaki et al. ........... 455/574 |
| 8,537,907 B2 | 9/2013 | Sung |
| 8,676,277 B2 | 3/2014 | Takayama |
| 2005/0077356 A1 | 4/2005 | Takayama et al. |
| 2006/0142034 A1 | 6/2006 | Wentink et al. |
| 2006/0286937 A1 | 12/2006 | Russell et al. |
| 2008/0224825 A1 | 9/2008 | Nystrom et al. |
| 2009/0209223 A1 | 8/2009 | Kone et al. |
| 2009/0247077 A1 | 10/2009 | Sklovsky et al. |
| 2010/0136908 A1 | 6/2010 | Hwang et al. |
| 2010/0144269 A1 | 6/2010 | Do et al. |
| 2010/0213895 A1 | 8/2010 | Keating et al. |
| 2010/0279606 A1 | 11/2010 | Hillan et al. |
| 2010/0311326 A1 * | 12/2010 | Klabunde et al. ............ 455/41.1 |
| 2011/0022755 A1 | 1/2011 | Sueyoshi et al. |
| 2011/0161697 A1 | 6/2011 | Qi et al. |
| 2011/0226853 A1 | 9/2011 | Soh et al. |
| 2011/0312279 A1 | 12/2011 | Tsai et al. |
| 2012/0045989 A1 | 2/2012 | Suumaeki et al. |
| 2012/0309302 A1 | 12/2012 | Buhot |
| 2013/0036050 A1 | 2/2013 | Giordano et al. |
| 2013/0084803 A1 | 4/2013 | Hall et al. |
| 2013/0203349 A1 * | 8/2013 | Hillan et al. ................. 455/41.1 |
| 2013/0281013 A1 | 10/2013 | Hillan |
| 2013/0309965 A1 | 11/2013 | Hillan |

FOREIGN PATENT DOCUMENTS

| | | |
|---|---|---|
| GB | 2328588 A | 2/1999 |
| JP | 2005018166 A | 1/2005 |
| WO | WO2007102115 A1 | 9/2007 |
| WO | 2009009545 A2 | 1/2009 |
| WO | WO-2011041383 A1 | 4/2011 |

OTHER PUBLICATIONS

International Search Report and Written Opinion—PCT/US2012/067407—ISA/EPO—Mar. 11, 2013.

* cited by examiner

REDUCING NFC PEER MODE CONNECTION TIMES

BACKGROUND

Aspects of the disclosure relate to communication technologies. In particular, aspects of the disclosure relate to methods, apparatuses, systems, and computer-readable media that implement Near Field Communication (NFC) technologies.

Increasingly, mobile devices, such as smart phones, personal digital assistants (PDAs), and the like, are implementing NFC technologies, which allow such devices to communicate with other NFC-enabled devices while in close proximity thereto. By supporting NFC technologies, these mobile devices provide enhanced functionalities and increased convenience to users, as NFC technologies have current and future applications in payments and transaction processing, user identification, and many other useful areas. Aspects of the disclosure are directed to ways of providing greater convenience and functionality to users of NFC-enabled devices.

SUMMARY

Aspects of the disclosure relate to reducing NFC Peer Mode connection times, for instance, in power-constrained devices (e.g., battery-powered devices, such as wireless handsets that consume electrical current provided by one or more batteries included therein). Before an NFC connection may be established between two NFC-enabled devices, at least one device may perform polling and listening operations using an equipped radio transceiver, for example, to respectively poll for and listen for other NFC-enabled devices. Constant use of such a radio and of a controlling processor, however, may quickly deplete the battery level of a battery-powered device, such as a smart phone or other mobile device. This may cause inconvenience to a user and/or make using NFC functionalities impractical. By implementing one or more aspects of the disclosure, the time needed to establish a connection between two or more NFC devices may be decreased and/or the amount of power consumed during execution of an NFC device discovery loop may be reduced.

According to one or more aspects, a mode switching interval associated with an NFC device discovery loop may be defined. A first portion of the mode switching interval may be assigned to polling operations, and a second portion of the mode switching interval may be assigned to listening operations. The first portion and the second portion of the mode switching interval respectively may occupy less than all of the mode switching interval. In addition, the second portion of the mode switching interval may be shifted in position within the mode switching interval for respective iterations of the NFC device discovery loop.

In at least one arrangement, the second portion of the mode switching interval is randomly shifted in position within the mode switching interval for respective iterations of the NFC device discovery loop. In other arrangements, the length of the second portion of the mode switching interval may be adjusted for respective iterations of the NFC device discovery loop.

In one or more additional arrangements, a set of instructions for operating the NFC device discovery loop may be provided to a state machine. In some arrangements, the set of instructions may be generated, while in other arrangements, the set of instructions may be obtained from an external device. The state machine may subsequently cycle between the first potion and the second portion of the mode switching interval for respective iterations of the NFC device discovery loop based on the set of instructions. In at least one additional arrangement, NFC device discovery functionality may be locally deactivated upon providing the set of instructions to the state machine. In still one or more arrangements, an interrupt may be received from the state machine, and the interrupt may be indicative of an NFC connection identified by the state machine. Subsequently, the NFC connection may be processed in response to the interrupt.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
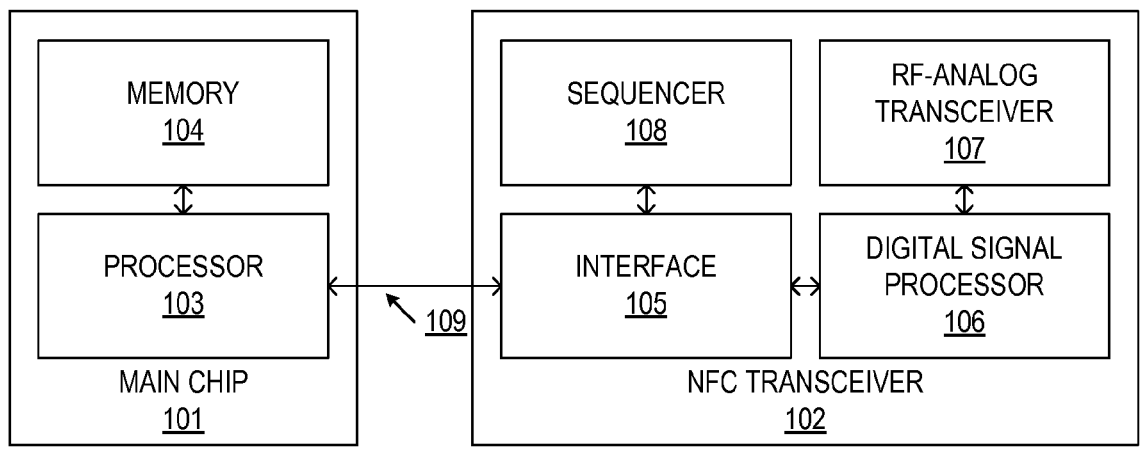
FIG. 1 illustrates an example device that may implement one or more aspects of the disclosure.

FIG. 1 illustrates an example device that may implement one or more aspects of the disclosure. As seen in FIG. 1, device 100 may include a main chip 101 and an NFC transceiver 102. Although main chip 101 and NFC transceiver 102 are described as being part of the same device 100, it is contemplated that in some arrangements, main chip 101 and NFC transceiver 102 may be separate and/or standalone devices. Further, in such arrangements, main chip 101 and NFC transceiver 102 might still operate in conjunction with each other (e.g., as components of a system).

In one or more arrangements, main chip 101 may include processor 103 and memory 104. Processor 103 may be a generic microprocessor and may include various sub-components that allow processor 103 to read and/or execute computer-readable instructions, such as computer-readable instructions stored in memory 104, to which processor 103 may be communicatively coupled (e.g., via a system bus and/or other connection components and/or the like), for instance. Memory 104 in turn may be a generic memory unit, such as a read-only memory (ROM) unit, a random-access memory (RAM) unit, a flash memory unit, an electrically erasable programmable read-only memory (EEPROM) unit, and/or any other type of memory unit and/or the like. Although main chip 101 is described as including one processor and one memory, it is contemplated that in one or more alternative arrangements, main chip 101 may include a plurality of processors and/or a plurality of processing cores. Additionally or alternatively, main chip 101 may include a plurality of memory units of one or more types (e.g., one or more ROM units, one or more RAM units, one or more flash memory units, one or more EEPROM units, etc.).

In one or more arrangements, NFC transceiver 102 may include various components that may enable NFC transceiver 102 to send and/or receive radiofrequency (RF) signals, such as RF signals used to poll for, listen for, establish connections with, and/or otherwise exchange data with other NFC-enabled devices. For example, NFC transceiver 102 may include an interface 105, which may be a serial bus interface via which other components of NFC transceiver 102 may electronically communicate with and/or be controlled by processor 103 and/or main chip 101. For instance, interface 105 may be communicatively coupled to processor 103 via serial link 109.

Additionally or alternatively, NFC transceiver 102 may include digital signal processor (DSP) 106. Digital signal processor 106 may, for instance, convert digital signals into analog signals and/or convert analog signals into digital signals, and thereby may provide an interface with an RF-analog transceiver 107, which in turn may be configured to transmit and/or receive various RF signals, including signals associated with NFC transmissions. In at least one arrangement, NFC transceiver 102 further may include a sequencer 108. As described in greater detail below, sequencer 108 may be configured to receive, store, and/or execute a set of instructions, such as a set of instructions that, when executed, cause NFC transceiver 102 to perform an NFC device discovery loop.

Figure 2:
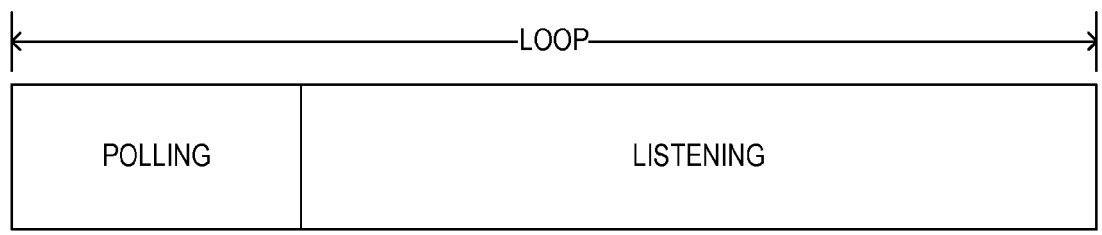
FIG. 2 illustrates an example of a mode switching interval of a conventional NFC device discovery loop that is known in the art.

FIG. 2 illustrates an example of a mode switching interval of a conventional NFC device discovery loop that is known in the art. In particular, the mode switching interval of the conventional NFC device discovery loop illustrated in FIG. 2 represents a mode switching interval of an NFC device discovery loop defined by the NFC Activity specification, which is promulgated by the NFC Forum.

As seen in FIG. 2, in the mode switching interval of the conventional NFC device discovery loop, an NFC device polls for other NFC devices during a first portion of the interval and then spends the entire remaining portion of the interval listening (e.g., for responses from one or more other NFC devices). If another NFC device responds while the first NFC device is listening, then the two devices may establish an NFC connection via which they can, for instance, exchange data. If, on the other hand, no other NFC device responds while the first NFC device is listening, then the first NFC device may repeat the mode switching interval, for instance, by again polling for other NFC devices. While the NFC device is polling and listening, however, the NFC device's radio (e.g., RF-analog transceiver 107) may be turned on and/or otherwise be in use, and the NFC device's processing unit (e.g., processor 103) may likewise be actively executing instructions to carry out the polling and/or the listening. Moreover, because the NFC device is constantly polling and listening throughout the mode switching interval of the conventional NFC device discovery loop, the NFC device (and particularly the NFC device's radio and processing unit) may consume a great deal of power (e.g., electrical current) while carrying out the mode switching interval of the NFC device discovery loop. In a power-constrained device, such as an NFC-capable battery-powered smart phone, for example, this large amount of power usage may be undesirable, as it could quickly drain the device's battery and thereby cause inconvenience to the user of the device. As described in greater detail below, various aspects of the disclosure may overcome one or more of these issues.

Figure 3:
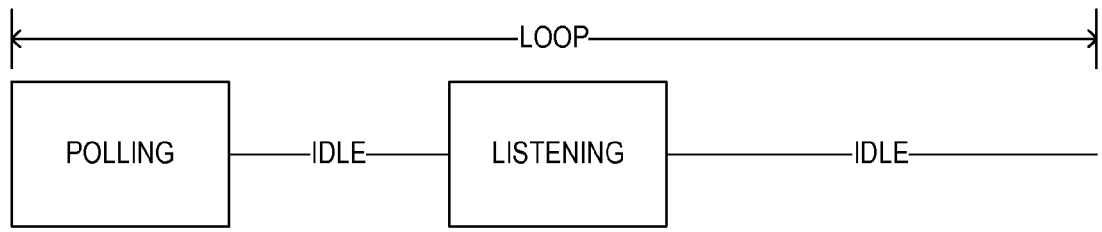
FIG. 3 illustrates an example of a mode switching interval of an NFC device discovery loop according to one or more illustrative aspects of the disclosure.

FIG. 3 illustrates an example of a mode switching interval of an NFC device discovery loop according to one or more illustrative aspects of the disclosure. More specifically, according to one or more aspects of the disclosure, one or more idling periods may be introduced into the mode switching interval of the NFC device discovery loop, such that an NFC device carrying out the mode switching interval of the NFC device discovery loop might not spend the entirety of the mode switching interval polling for and listening for other NFC devices. Rather, during the idling periods of the mode switching interval, the NFC device may be able to power down (or otherwise place into a low-power or sleep state) components that might otherwise consume a great deal of power, such as the NFC device's processing unit (e.g., processor 103) and/or radio (e.g., RF-analog transceiver 107), thereby conserving power for other functions and/or otherwise extending the NFC device's battery life.

Figure 4:
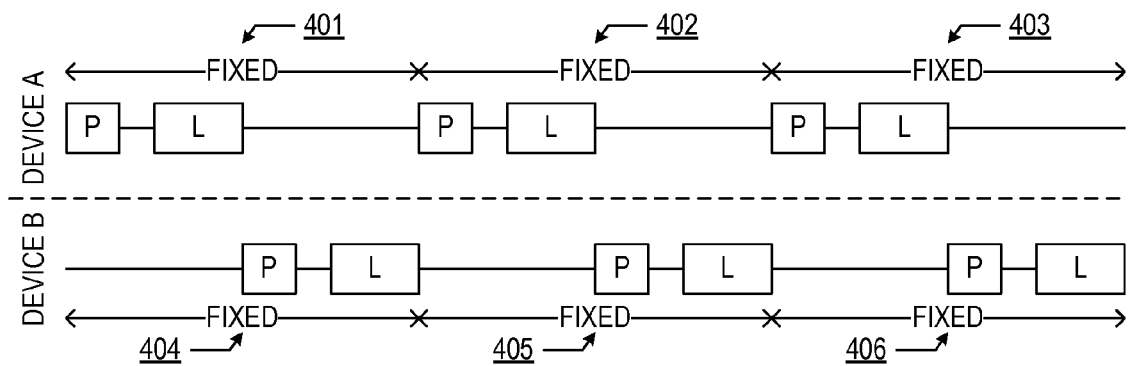
FIG. 4 illustrates an example of an NFC device discovery loop that includes fixed polling, listening, and idling portions.

Referring now to FIG. 4, an example of an NFC device discovery loop that includes fixed polling, listening, and idling portions is illustrated. In particular, in the example NFC device discovery loop illustrated in FIG. 4, each device performs three mode switching intervals. Device A, for instance, performs mode switching intervals 401, 402, and 403, and Device B performs mode switching intervals 404, 405, and 406. Because these mode switching intervals include fixed polling, listening, and idling portions, however, it might be possible that Device A is never polling when Device B is listening, and vice versa. Thus, it might be possible that Device A and Device B never establish an NFC connection. In one or more arrangements, however, this circumstance may be avoided by shifting the position of the listening operations within the mode switching interval, for example, such that the mode switching interval is variable across iterations during the NFC device discovery loop. Additionally or alternatively, other aspects of the mode switching interval may likewise be shifted and/or altered so as to similarly produce this result, as described in greater detail below.

Figure 5:
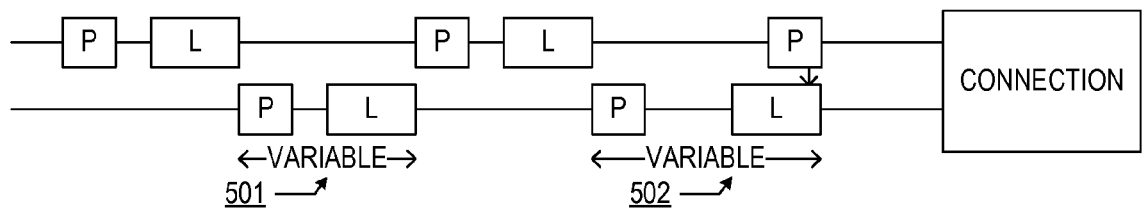
FIG. 5 illustrates an example of an NFC device discovery loop that includes variable polling, listening, and idling portions.

An example of an NFC device discovery loop in which aspects of the mode switching interval vary across iterations is illustrated in FIG. 5. In particular, in the example NFC device discovery loop in FIG. 5, the portion of the mode switching interval assigned to listening operations during a second iteration of the interval 502 is shifted in position relative to a first iteration of the mode switching interval 501. In this example, as a result of the shift in position, the polling operations of one NFC device coincide with the listening operations of another NFC device, and accordingly, the two NFC devices are able to subsequently establish a connection.

Having described various features of an NFC device discovery loop according to one or more aspects of the disclosure, an example method of implementing one or more of these functionalities and features (e.g., in an NFC enabled device) will now be described.

Figure 6:
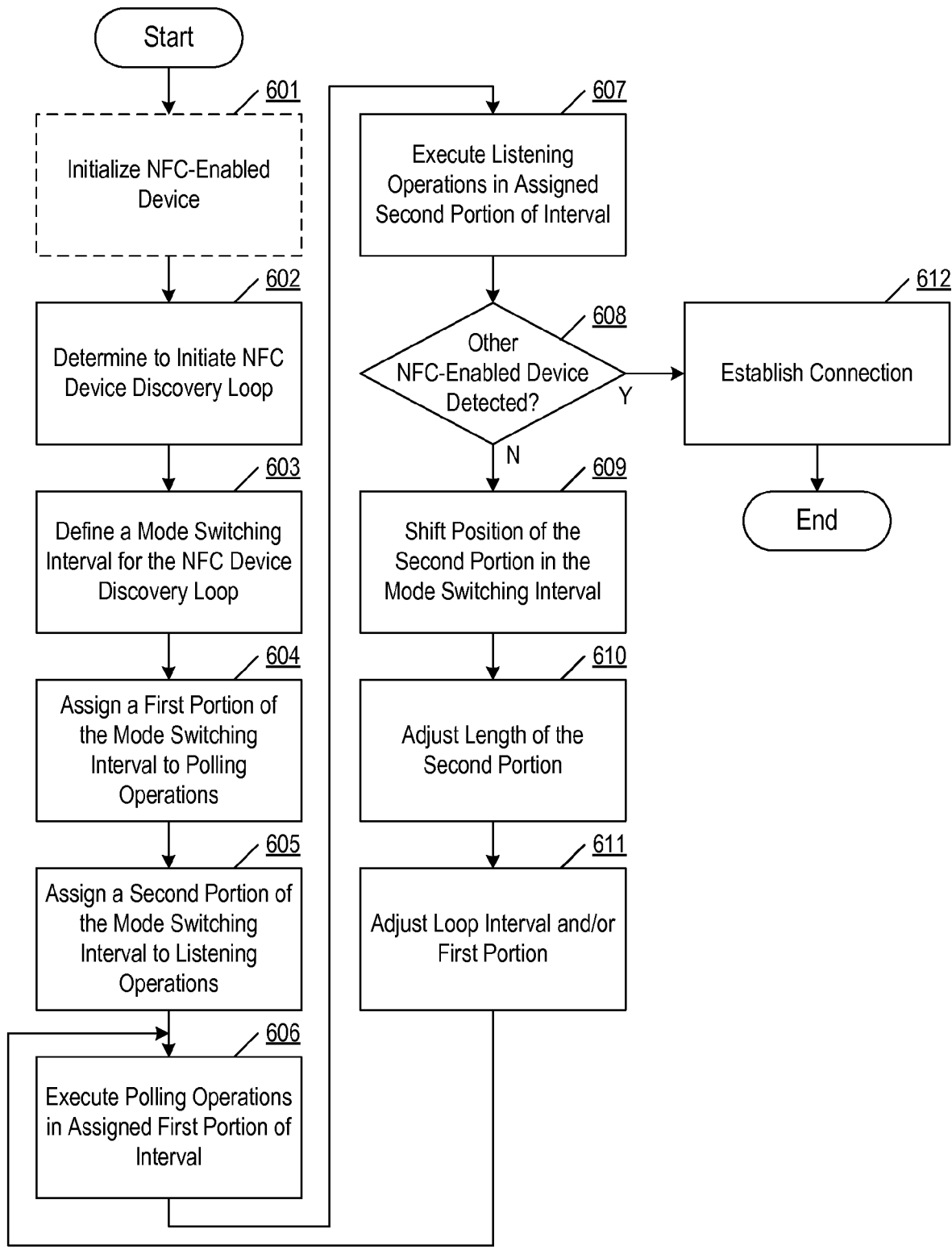
FIG. 6 illustrates an example method of reducing NFC Peer Mode connection times according to one or more illustrative aspects of the disclosure.

FIG. 6 illustrates an example method of reducing NFC Peer Mode connection times according to one or more illustrative aspects of the disclosure. In one or more arrangements, any and/or all of the steps of the method of FIG. 6 may be performed by a computing device, such as device 100.

In step 601, an NFC-enabled device may be initialized. For example, in step 601, a computing device, such as device 100, may power on various components, such as a processor (e.g., processor 103), a memory (e.g., memory 104), a radio (e.g., RF-analog transceiver 107), and/or other components and/or the like. Additionally or alternatively, the computing device may, for instance, load and/or execute various software programs, such as one or more operating system programs, applications, and so on, which may be stored in memory.

In step 602, the NFC-enabled device may determine to initiate an NFC device discovery loop. For example, in step 602, the computing device may determine based on one or more user preferences, default settings, and/or user commands, to initiate an NFC device discovery loop (e.g., in which the computing device may discover and/or be discovered by one or more other NFC-enabled devices). In some arrangements, the computing device may be configured such that the NFC device discovery loop is initiated as soon as the NFC-enabled device is powered on and/or initialized, for instance. In other arrangements, the computing device may be configured such that the NFC device discovery loop is initiated only after a user changes one or more preferences and/or settings specifying that the computing device should discover, and/or be discovered by, one or more other NFC devices.

In step 603, a mode switching interval for the NFC device discovery loop may be defined. For example, in step 603, the computing device may define a mode switching interval for the NFC device discovery loop by determining and/or defining a loop duration for the mode switching interval, determining and/or defining which NFC technologies the device should poll for, and/or determining and/or defining whether the device should subsequently perform listening operations, and if so, for how long such listening operations should last.

In one or more arrangements, the loop duration of the mode switching interval may refer to the total length, in units of time, for instance, of a single mode switching interval of the NFC device discovery loop. Thus, in one example, the loop duration of the mode switching interval may initially be determined to be and/or defined as 300 milliseconds, such that any polling operations, listening operations, and/or idling operations to be performed during an initial iteration of the mode switching interval may occur within the defined loop duration (e.g., 300 milliseconds) before being repeated during a subsequent iteration of the mode switching interval. In some arrangements, the loop duration may later be adjusted in subsequent iterations of the mode switching interval, as discussed in greater detail below.

As also noted above, an NFC-enabled device may be configured to poll for a plurality of different NFC technologies during a single mode switching interval. For example, during a single mode switching interval, an NFC-enabled device may perform one or more polling operations in which the NFC-enabled device polls one or more times for "A"-type NFC devices, one or more times for "B"-type NFC devices, and/or one or more times for "F"-type NFC devices. These different types of NFC technologies may correspond to different implementations of NFC used by different device manufacturers, and while these types are used as examples here, other types of NFC technologies may similarly be used instead of and/or in addition to those discussed here. In addition to determining and/or defining the particular NFC technologies that the device should poll for, the number of times the NFC-enabled device should poll for each technology during a mode switching interval also may be determined and/or defined during step 603, for instance.

In step 604, a first portion of the mode switching interval may be assigned to polling operations. For example, in step 604, the computing device may determine that, during a particular time period within the mode switching interval (e.g., a range of milliseconds, such as from 20 milliseconds into the mode switching interval to 60 milliseconds into the mode switching interval), the device will poll for other NFC devices (e.g., by performing polling operations for the particular types of NFC technologies determined in step 603, which may include performing polling operations for devices implementing any and/or all of NFC-A, NFC-B, NFC-F, and/or other, proprietary radio technologies). Subsequently, the computing device may store this time period (e.g., in memory) such that when the mode switching interval of the NFC device discovery loop is performed, the device will perform polling operations during the determined time period. In some instances, the amount of time spent polling for a particular type of NFC technology may be predetermined and/or specified by one or more standards that define aspects of the particular type of NFC technology. In these instances, the computing device may simply determine an order in which polling operations will be performed for different types of technologies and a time within the mode switching interval at which polling operations are to begin (e.g., at 20 milliseconds into the mode switching interval). Additionally or alternatively, in these instances, the first portion of the mode switching interval may correspond to (and be determined based on) the total amount of time needed to complete all of the polling operations during a single iteration of the mode switching interval.

Subsequently, in step 605, a second portion of the mode switching interval may be assigned to listening operations. For example, in step 605, the computing device may determine that during another time period within the mode switching interval (e.g., a range of milliseconds, such as from 150 milliseconds into the mode switching interval to 250 milliseconds into the mode switching interval), the device will listen for other NFC devices (e.g., by performing listening operations for various types of NFC technologies, such as NFC-A, NFC-B, NFC-F, and/or other proprietary radio technologies). In addition, the computing device may store this time period (e.g., in memory) such that when the mode switching interval of the NFC device discovery loop is performed, the device will performing listening operations during the determined time period.

According to one or more aspects, once a first portion of the mode switching interval has been assigned to polling operations and a second portion of the mode switching interval has been assigned to listening operations, there may be remaining portions of the mode switching interval that are not assigned to polling operations and that also are not assigned to listening operations. In other words, the first portion of the mode switching interval and the second portion of the mode switching interval may occupy less than all of the mode switching interval. During the one or more unoccupied portions of the mode switching interval (e.g., the one or more portions of the mode switching interval that are not occupied by polling operations and/or listening operations), the device may be idle and, as described above, may power down one or more components and/or otherwise enter a low-power state to conserve power resources, for instance.

The device then may begin to perform actions associated with the defined mode switching interval of the NFC device discovery loop, for example.

In step 606, the device may begin to perform actions associated with the defined mode switching interval, for example, by executing polling operations during the assigned first portion of the mode switching interval. For instance, in step 606, the NFC-enabled device may poll, during the time period assigned in step 604, for other NFC devices that use the one or more types of NFC technologies determined in step 603. In polling for other NFC devices, the NFC-enabled device may cause one or more RF signals to be transmitted (e.g., via a radio, such as RF-analog transceiver 107), and the one or more RF signals may be configured to cause one or more other NFC devices receiving such signals to transmit one or more RF signals in response. In this manner, for instance, the NFC-enabled device may transmit a polling command appropriate for each particular radio technology to be polled for (e.g., NFC-A, NFC-B, NFC-F, etc.) and wait for a corresponding response.

In step 607, the device may execute listening operations during the assigned second portion of the mode switching interval. For example, in step 607, the NFC-enabled device may, during the time period assigned in step 605, listen for one or more signals transmitted from other NFC devices, such as one or more RF signals transmitted from other NFC devices in response to the polling signals transmitted in step 606, for instance. Additionally or alternatively, the NFC enabled device may, for instance, listen for one or more polling signals transmitted from other NFC devices during the assigned second portion of the mode switching interval. Listening may, for instance, include becoming sensitive to the polling command of a particular radio technology (e.g., NFC-A, NFC-B, NFC-F, etc.) and transmitting an appropriate poll response if a polling command is detected.

In step 608, it may be determined whether one or more other NFC devices were detected during the listening operations. For example, in step 608, the device may determine whether any RF signals were received from any other NFC devices during the assigned second portion of the mode switching interval.

If it is determined, in step 608, that one or more other NFC devices were detected during the listening operations, then in step 609, the device may establish one or more NFC connections with the corresponding one or more other NFC devices.

On the other hand, if it is determined, in step 608, that no other NFC devices were detected during the listening operations, then in step 610, the device may shift (and/or otherwise reassign, recompute, and/or change) the position of the second portion (e.g., the portion assigned to listening operations) within the mode switching interval. According to one or more aspects, the device may shift the position of the second portion in the mode switching interval prior to executing the next iteration of the mode switching interval within the NFC device discovery loop. For example, in step 610, the device may assign a different start time and/or a different end time for listening operations within the mode switching interval (e.g., a different range of milliseconds than previously assigned to listening operations, such as 180 milliseconds into the mode switching interval to 280 milliseconds into the mode switching interval) prior to the next iteration of the mode switching interval.

In at least one arrangement, the device may randomly shift the position of the second portion within the mode switching interval. For example, the device may randomly shift the position of the second portion by subtracting the length of the second portion (e.g., in units of time) from the length of the mode switching interval (e.g., also in units of time), and then randomly selecting a point within the difference as the time at which listening operations should begin. Additionally or alternatively, if the randomly selected point would cause the listening operations to overlap with the first portion of the mode switching interval (e.g., in which polling operations are to occur), then the device may repeat the step of randomly selecting a point within the previously computed difference until a point is selected that would not cause the listening operations to overlap with the first portion of the mode switching interval.

In one or more additional or alternative arrangements, the device may, in step 610, shift the position of the second portion in accordance with one or more algorithms. For example, the device may execute, cause to be executed, and/or receive the results of an algorithm that shifts the position of the second portion (e.g., in which listening operations are to occur) sequentially and/or incrementally (e.g., with respect to previous iterations of the mode switching interval), in accordance with one or more user preferences, and/or based on other factors (e.g., the type(s) of technologies being polled for during the polling operations, the current battery level of the device, etc.). By providing for the adjustment of the second portion of the mode switching interval (e.g., the portion of the mode switching interval assigned to listening operations) in this manner, and/or by providing for the adjustment of other aspects of the mode switching interval, as described in greater detail below, it may be possible to achieve any desired balance between power consumption and connection time based on whatever criteria may be most important at a particular time.

In step 611, the device may adjust the length of the second portion (e.g., the portion assigned to listening operations) within the mode switching interval. In one or more arrangements, adjusting the length of the second portion may be based on one or more algorithms. For example, in some arrangements, the device may adjust the length of the second portion based on a dynamic allocation algorithm, where the length (e.g., in units of time) is increased after another NFC device is discovered and incrementally decreased after each iteration of the mode switching interval where another NFC device is not discovered. In other arrangements, the device may adjust the length of the second portion based on one or more user preferences. For example, if the user has set preferences prioritizing NFC discoverability over power conservation, then the device may incrementally increase the length of the second portion after each iteration of the mode switching interval; on the other hand, if the user has set preferences prioritizing power conservation over NFC discoverability, then the device may incrementally decrease the length of the second portion after each iteration of the mode switching interval. In some arrangements, adjusting the length of the second portion may include using these algorithms and/or taking other factors into account, such as the type(s) of technologies being polled for during the polling operations and/or the current battery level of the device.

In step 612, the device may adjust other aspects of the mode switching interval and/or one or more aspects of the first portion. For example, in step 612, the device may adjust one or more aspects of the mode switching interval, such as the loop duration, the one or more NFC technologies to be polled for during the polling operations, and/or the like. Additionally or alternatively, the device may, for instance, adjust one or more aspects of the first portion (e.g., in which polling operations are executed), such as the position of the first portion within the mode switching window, the length of the first portion, and/or the like. In adjusting these aspects of the mode switching interval and/or the first portion, the device may use one or more algorithms (and/or take into account any and/or all of the factors) discussed above with respect to steps 610 and 611.

Subsequently, the method may return to step 606, where another iteration of the mode switching interval will be executed, taking into account any adjustments made in steps 610, 611, and/or 612.

Another way of conserving power while executing an NFC device discovery loop may be to delegate NFC device discovery operations from a processor-equipped device to a simpler, less power-intensive device, such as an NFC transceiver. An example of a method that implements such features and functionalities will now be described.

Figure 7:
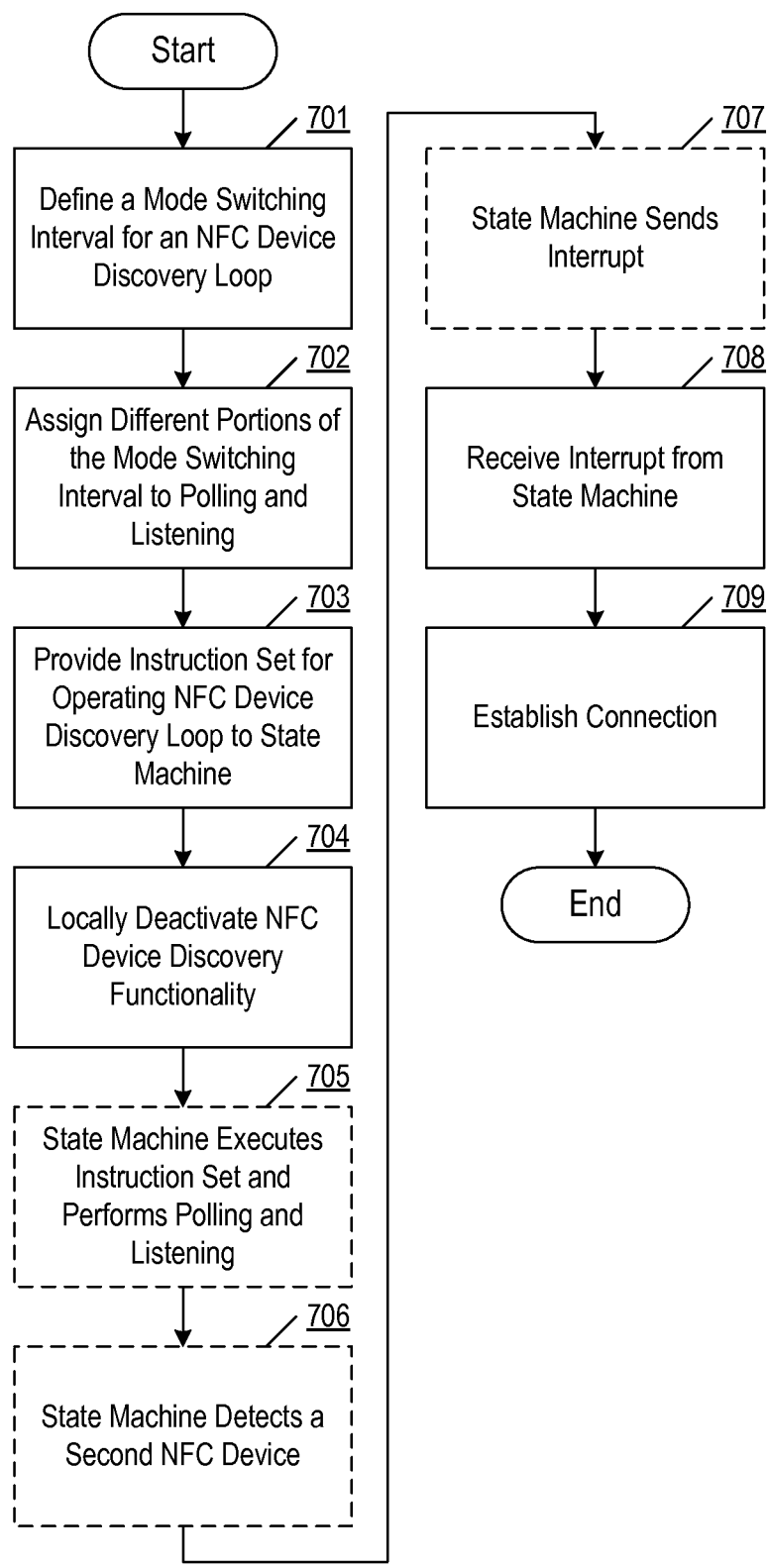
FIG. 7 illustrates an example method of delegating NFC device discovery operations to a simple NFC device according to one or more illustrative aspects of the disclosure.

FIG. 7 illustrates an example method of delegating NFC device discovery operations to a simple NFC device according to one or more illustrative aspects of the disclosure. In step 701, a mode switching interval for an NFC device discovery loop may be defined. For example, in step 701, a processor-equipped device, such as main chip 101 of FIG. 1, may define a mode switching interval for an NFC device discovery loop, similar to how such a mode switching interval was defined in step 603 above.

Referring again to FIG. 7, in step 702, different portions of the mode switching interval may be assigned to polling operations and listening operations. For example, in step 702, the processor-equipped device (e.g., main chip 101) may assign different portions of the mode switching interval to polling operations and listening operations, similar to how such assignments were made in steps 604 and 605 above.

In step 703, an instruction set for operating the NFC device discovery loop may be provided to a state machine. For example, in step 703, the processor-equipped device (e.g., main chip 101) may provide an instruction set for executing the NFC device discovery loop (e.g., where the instruction set includes instructions for performing the polling operations, listening operations, idling operations, and/or iterative adjustments) to a simpler device or component on an NFC transceiver, where the simpler device or component may function as a state machine. In at least one arrangement, this simpler device or component may be a sequencer, such as sequencer 108 of FIG. 1, that may be capable of executing the simple instruction set and/or generating an interrupt to the processor-equipped device when one or more particular conditions are met and/or when execution of the provided instruction set has been completed. While a sequencer is used and discussed in the examples here, any similarly programmable component could be used instead of and/or in addition to a sequencer.

In some arrangements, the processor-equipped device (e.g., main chip 101) may generate the instruction set to be provided to the state machine. In these arrangements, for example, the processor-equipped device may generate the instruction set by creating a step-by-step listing of computer-readable instructions that, when executed by the state machine (e.g., the sequencer), cause the state machine to perform the NFC device discovery loop as defined during steps 701 and/or 702 described above. In other arrangements, the processor-equipped device may obtain the instruction set from an external device. In these arrangements, for instance, the processor-equipped device may download the instruction set from a server or load the instruction set from a storage device and/or memory unit.

Referring again to FIG. 7, in step 704, NFC device discovery functionality may be locally deactivated. For example, in step 704, having provided an instruction set for executing the NFC device discovery loop to a sequencer (e.g., sequencer 108), the processor-equipped device (e.g., main chip 101) may locally deactivate NFC device discovery functionality by entering a low-power state (e.g., a sleep state) and/or by performing other processing functions not related to NFC device discovery. In the meantime, for instance, the sequencer may execute the NFC device discovery loop in accordance with the provided instruction set.

In step 705, the state machine (e.g., the sequencer, such as sequencer 108) may execute the provided instruction set to cycle through and/or otherwise perform the polling operations, listening operations, and/or idling operations associated with the NFC device discovery loop. Additionally or alternatively, the state machine (e.g., the sequencer) may perform the adjustment operations described above prior to each iteration of the mode switching interval during the NFC device discovery loop.

Subsequently, in step 706, the state machine (e.g., the sequencer) may detect another NFC device. For example, in step 706, the sequencer (e.g., sequencer 108) may detect one or more RF signals from another NFC device while performing listening operations associated with the NFC device discovery loop. Accordingly, in step 707, the state machine (e.g., the sequencer) may send an interrupt to the processor-equipped device (e.g., main chip 101). The interrupt may, for instance, be configured to notify the processor-equipped device that another NFC device has been detected and/or that execution of the instruction set has been and/or is being terminated. For example, the interrupt may indicate that an NFC connection has been identified by the state machine (e.g., the sequencer) and/or may include additional details about the identified connection.

In step 708, the processor-equipped device (e.g., main chip 101) may receive the interrupt from the state machine (e.g., sequencer 108). Subsequently, the processor-equipped device (e.g., main chip 101) may wake the processor from the low-power state (e.g., the sleep state) and/or may resume NFC device discovery processes on the processor, so as to facilitate establishing a connection with the detected NFC device.

Thereafter, in step 709, the processor-equipped device (e.g., main chip 101) may establish a connection with the detected NFC device (and/or cause such a connection to be established by controlling one or more other components of device 100).

Figure 8:
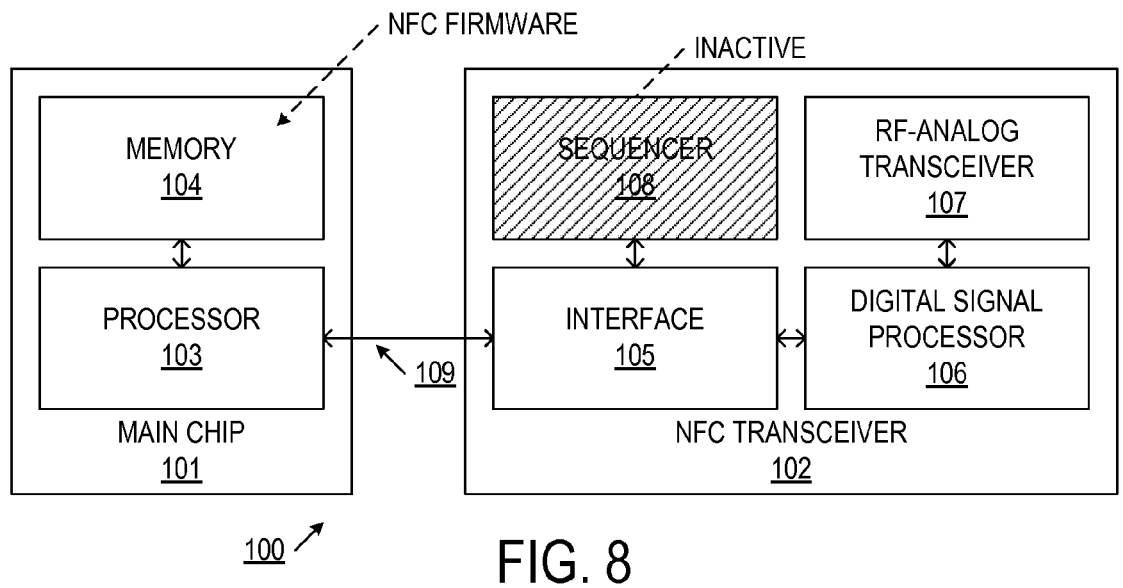
FIGS. 8 and 9 illustrate interactions between a processor-equipped device and an NFC transceiver before and after NFC device discovery operations are delegated according to one or more illustrative aspects of the disclosure.
Figure 9:
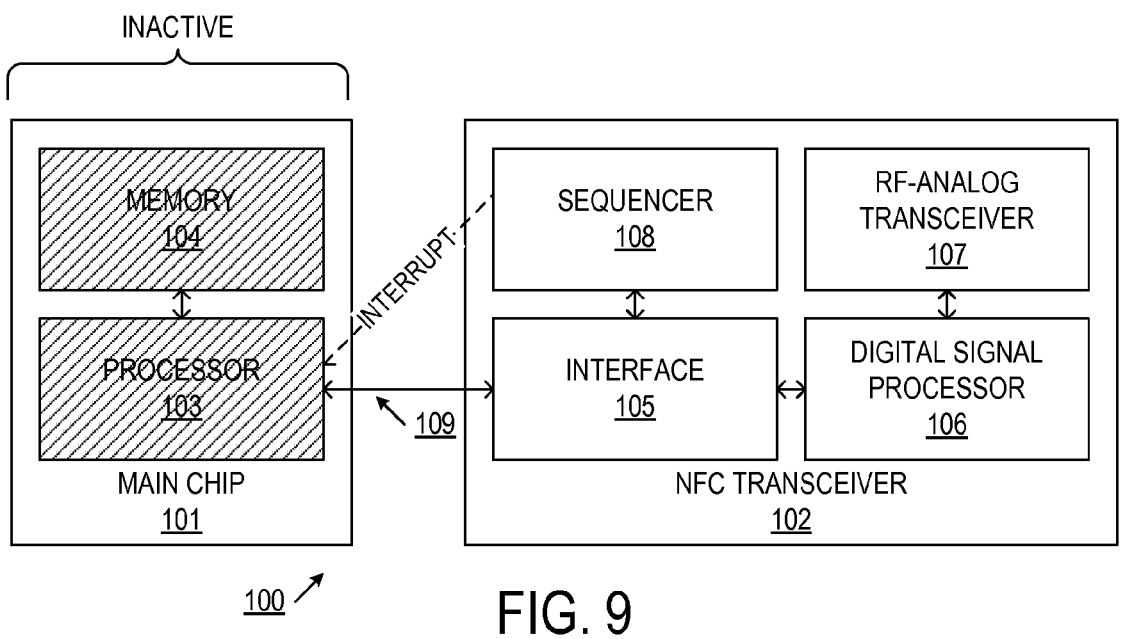

FIGS. 8 and 9 illustrate interactions between a processor-equipped device and an NFC transceiver before and after NFC device discovery operations are delegated according to one or more illustrative aspects of the disclosure. For example, in FIG. 8, sequencer 108 is illustrated as being inactive, as it might not have yet received an instruction set from the processor-equipped device (e.g., main chip 101). In addition, such an instruction set, which may include NFC firmware, for instance, may be stored in memory 104, where it may be accessed by processor 103. In some arrangements, prior to being stored in memory 104, such an instruction set, including the NFC firmware, may be generated by processor 103 based on other computer-readable instructions executed by processor 103.

In FIG. 9, processor 103 and memory 104 of main chip 101 are illustrated as being inactive, as it this point, processor 103 may have already provided an instruction set to sequencer 108, and the instruction set may cause sequencer 108 and/or NFC transceiver 102 to execute the NFC device discovery loop without further control from processor 103 (e.g., at least until another NFC device is detected). In addition, in FIG. 9, an interrupt message is illustrated to show how sequencer 108 may interrupt processor 103 (e.g., via interface 105 and/or serial link 109) to facilitate the establishment of a connection with a detected NFC device.

Figure 10:
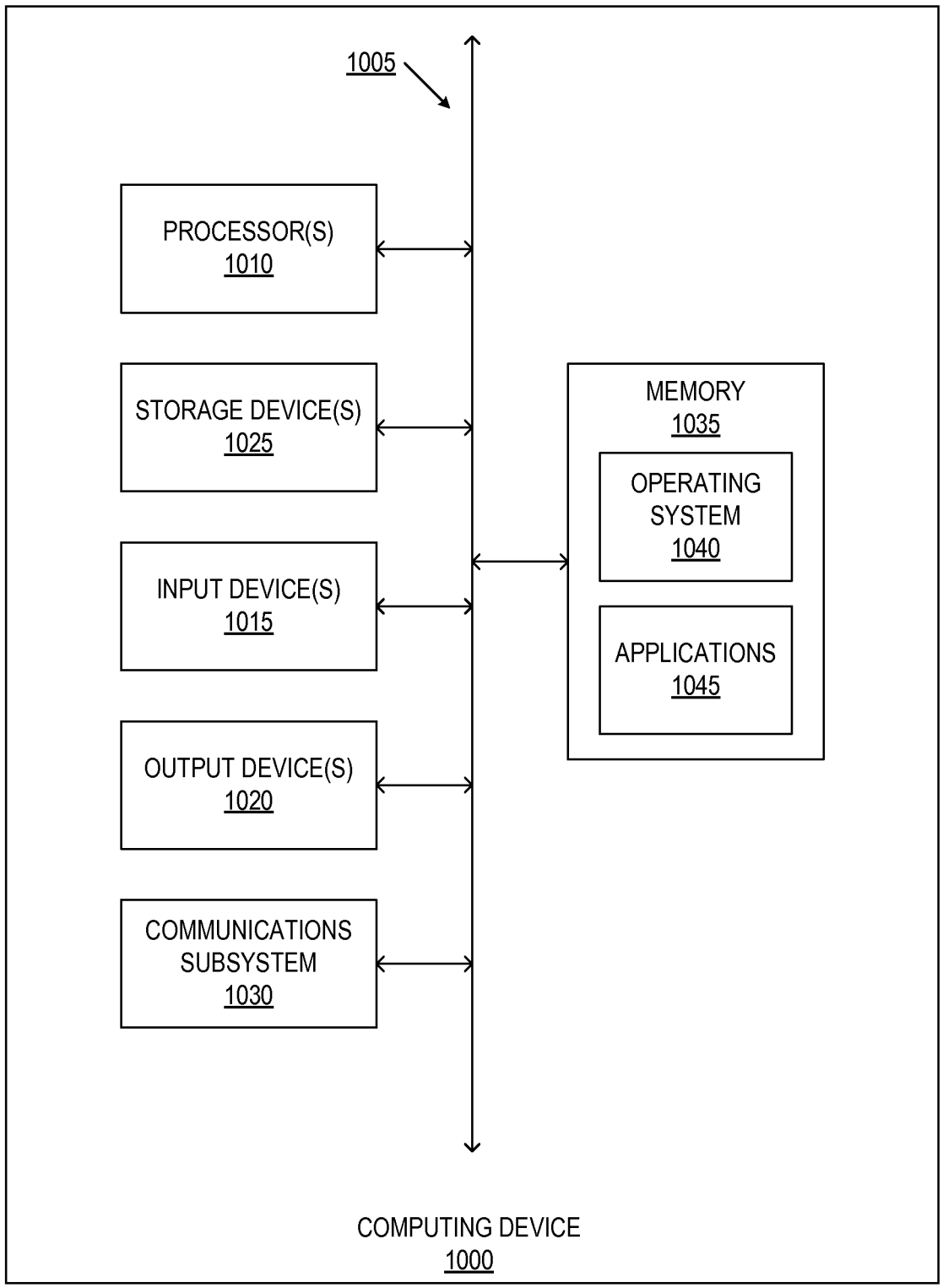
FIG. 10 illustrates an example computing system in which one or more aspects of the disclosure may be implemented.

An example of a computing system in which various aspects of the disclosure may be implemented will now be described with respect to FIG. 10. According to one or more aspects, a computer system as illustrated in FIG. 10 may be incorporated as part of a computing device, which may implement, perform, and/or execute any and/or all of the features, methods, and/or method steps described herein. For example, computer system 1000 may represent some of the components of a hand-held device. A hand-held device may be any computing device with an input sensory unit, such as a camera and/or a display unit. Examples of a hand-held device include but are not limited to video game consoles, tablets, smart phones, and mobile devices. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, a set-top box, and/or a computer system. FIG. 10 is meant only to provide a generalized illustration of various components, any and/or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a camera, a mouse, a keyboard and/or the like; and one or more output devices 1020, which can include without limitation a display unit, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method, comprising:
    defining a mode switching interval associated with a near field communication (NFC) device discovery loop;
    assigning a first portion of the mode switching interval to polling operations; and
    assigning a second portion of the mode switching interval to listening operations,
    wherein the first portion and the second portion of the mode switching interval respectively occupy less than all of the mode switching interval, and
    wherein the second portion of the mode switching interval is shifted within the mode switching interval for respective iterations of the NFC device discovery loop.

2. The method of claim 1, wherein the second portion of the mode switching interval is randomly shifted within the mode switching interval for respective iterations of the NFC device discovery loop.

3. The method of claim 1, wherein the second portion of the mode switching interval is modified by one or more algorithms for respective iterations of the NFC device discovery loop.

4. The method of claim 1, wherein assigning the second portion comprises adjusting length of the second portion of the mode switching interval for respective iterations of the NFC device discovery loop.

5. The method of claim 1, further comprising:
    providing a set of instructions for operating the NFC device discovery loop to a state machine,
    wherein the state machine cycles between the first portion and the second portion of the mode switching interval for respective iterations of the NFC device discovery loop based on the set of instructions.

6. The method of claim 5, further comprising:
    locally deactivating NFC device discovery functionality upon providing the set of instructions to the state machine.

7. The method of claim 6, further comprising:
    receiving an interrupt from the state machine, the interrupt indicative of an NFC connection identified by the state machine; and
    processing the NFC connection in response to the interrupt.

8. The method of claim 5, further comprising:
    generating the set of instructions.

9. The method of claim 5, further comprising:
    obtaining the set of instructions from an external device.

10. An apparatus, comprising:
at least one processor; and
memory storing computer-readable instructions that, when executed by the at least one processor, cause the apparatus to:
define a mode switching interval associated with a near field communication (NFC) device discovery loop;
assign a first portion of the mode switching interval to polling operations; and
assign a second portion of the mode switching interval to listening operations,
wherein the first portion and the second portion of the mode switching interval respectively occupy less than all of the mode switching interval, and
wherein the second portion of the mode switching interval is shifted within the mode switching interval for respective iterations of the NFC device discovery loop.

11. The apparatus of claim 10, wherein the second portion of the mode switching interval is randomly shifted within the mode switching interval for respective iterations of the NFC device discovery loop.

12. The apparatus of claim 10, wherein the second portion of the mode switching interval is modified by one or more algorithms for respective iterations of the NFC device discovery loop.

13. The apparatus of claim 10, wherein assigning the second portion comprises adjusting length of the second portion of the mode switching interval for respective iterations of the NFC device discovery loop.

14. The apparatus of claim 10, wherein the memory stores additional computer-readable instructions that, when executed by the at least one processor, further cause the apparatus to:
provide a set of instructions for operating the NFC device discovery loop to a state machine,
wherein the state machine cycles between the first portion and the second portion of the mode switching interval for respective iterations of the NFC device discovery loop based on the set of instructions.

15. The apparatus of claim 14, wherein the memory stores additional computer-readable instructions that, when executed by the at least one processor, further cause the apparatus to:
locally deactivate NFC device discovery functionality upon providing the set of instructions to the state machine.

16. The apparatus of claim 15, wherein the memory stores additional computer-readable instructions that, when executed by the at least one processor, further cause the apparatus to:
receive an interrupt from the state machine, the interrupt indicative of an NFC connection identified by the state machine; and
process the NFC connection in response to the interrupt.

17. The apparatus of claim 14, wherein the memory stores additional computer-readable instructions that, when executed by the at least one processor, further cause the apparatus to:
generate the set of instructions.

18. The apparatus of claim 14, wherein the memory stores additional computer-readable instructions that, when executed by the at least one processor, further cause the apparatus to:
obtain the set of instructions from an external device.

19. At least one non-transitory computer-readable medium having computer-executable instructions stored thereon that, when executed, cause at least one computing device to:
define a mode switching interval associated with a near field communication (NFC) device discovery loop;
assign a first portion of the mode switching interval to polling operations; and
assign a second portion of the mode switching interval to listening operations,
wherein the first portion and the second portion of the mode switching interval respectively occupy less than all of the mode switching interval, and
wherein the second portion of the mode switching interval is shifted within the mode switching interval for respective iterations of the NFC device discovery loop.

20. The at least one non-transitory computer-readable medium of claim 19, wherein the second portion of the mode switching interval is randomly shifted within the mode switching interval for respective iterations of the NFC device discovery loop.

21. The at least one non-transitory computer-readable medium of claim 19, wherein the second portion of the mode switching interval is modified by one or more algorithms for respective iterations of the NFC device discovery loop.

22. The at least one non-transitory computer-readable medium of claim 19, wherein assigning the second portion comprises adjusting length of the second portion of the mode switching interval for respective iterations of the NFC device discovery loop.

23. The at least one non-transitory computer-readable medium of claim 19, having additional computer-executable instructions stored thereon that, when executed, further cause the at least one computing device to:
provide a set of instructions for operating the NFC device discovery loop to a state machine,
wherein the state machine cycles between the first portion and the second portion of the mode switching interval for respective iterations of the NFC device discovery loop based on the set of instructions.

24. The at least one non-transitory computer-readable medium of claim 23, having additional computer-executable instructions stored thereon that, when executed, further cause the at least one computing device to:
locally deactivate NFC device discovery functionality upon providing the set of instructions to the state machine.

25. The at least one non-transitory computer-readable medium of claim 24, having additional computer-executable instructions stored thereon that, when executed, further cause the at least one computing device to:
receive an interrupt from the state machine, the interrupt indicative of an NFC connection identified by the state machine; and
process the NFC connection in response to the interrupt.

26. The at least one non-transitory computer-readable medium of claim 23, having additional computer-executable instructions stored thereon that, when executed, further cause the at least one computing device to:
generate the set of instructions.

27. The at least one non-transitory computer-readable medium of claim 23, having additional computer-executable instructions stored thereon that, when executed, further cause the at least one computing device to:
obtain the set of instructions from an external device.

28. A system, comprising:
- means for defining a mode switching interval associated with a near field communication (NFC) device discovery loop;
- means for assigning a first portion of the mode switching interval to polling operations; and
- means for assigning a second portion of the mode switching interval to listening operations,
- wherein the first portion and the second portion of the mode switching interval respectively occupy less than all of the mode switching interval, and
- wherein the second portion of the mode switching interval is shifted within the mode switching interval for respective iterations of the NFC device discovery loop.

29. The system of claim 28, wherein the second portion of the mode switching interval is randomly shifted within the mode switching interval for respective iterations of the NFC device discovery loop.

30. The system of claim 28, wherein the second portion of the mode switching interval is modified by one or more algorithms for respective iterations of the NFC device discovery loop.

31. The system of claim 28, wherein assigning the second portion comprises adjusting length of the second portion of the mode switching interval for respective iterations of the NFC device discovery loop.

32. The system of claim 28, further comprising:
- means for providing a set of instructions for operating the NFC device discovery loop to a state machine,
- wherein the state machine cycles between the first portion and the second portion of the mode switching interval for respective iterations of the NFC device discovery loop based on the set of instructions.

33. The system of claim 32, further comprising:
- means for locally deactivating NFC device discovery functionality upon providing the set of instructions to the state machine.

34. The system of claim 33, further comprising:
- means for receiving an interrupt from the state machine, the interrupt indicative of an NFC connection identified by the state machine; and
- means for processing the NFC connection in response to the interrupt.

35. The system of claim 32, further comprising:
- means for generating the set of instructions.

36. The system of claim 32, further comprising:
- means for obtaining the set of instructions from an external device.

* * * * *